Nov. 21, 1967  F. BENJAMIN  3,354,384
POWER SUPPLY IMPEDANCE CONTROL WITH POSITIVE SLOPE
Filed July 30, 1964

INVENTOR
FRED BENJAMIN
BY HIS ATTORNEYS
HARRIS, KIECH, RUSSELL & KERN

United States Patent Office 3,354,384
Patented Nov. 21, 1967

3,354,384
POWER SUPPLY IMPEDANCE CONTROL
WITH POSITIVE SLOPE
Fred Benjamin, Fullerton, Calif., assignor to Christie
Electric Corporation, Los Angeles, Calif., a corporation of California
Filed July 30, 1964, Ser. No. 386,354
13 Claims. (Cl. 323—89)

ABSTRACT OF THE DISCLOSURE

A D.C. power supply for a xenon arc lamp including a saturable reactor for power control for constant lamp output. A pair of control windings for the saturable reactor, with one winding energized by a voltage signal from an output shunt resistor and with the other winding energized by a current signal from an output series resistor. A positive slope control with negative current feedback and positive voltage feedback such that an increase in output voltage produces an increase in output power. A negative slope control with negative current feedback and negative voltage feedback.

This invention relates to D.C. power supplies and, in particular, to power supplies with new and improved power supply impedance control.

For certain loads or under certain operating conditions, it is desirable to have a power supply with a positive slope voltage-current characteristic, that is to say, a power supply wherein the output current increases as the output voltage increases. It has been found that long-term operation of arc lamps such as xenon lamps, with constant light intensity can be obtained by energizing the lamps with a positive slope power supply. This is in contrast to earlier power supplies which have been designed to provide constant power output with negative slope or to provide constant current with a zero slope.

Accordingly, it is an object of the present invention to provide a new and improved D.C. power supply having a positive slope for the voltage-current output characteristic. A further object is to provide such a power supply including means for adjusting the slope of the output characteristic.

It is an additional object of the invention to provide a D.C. power supply which can be operated to provide a positive slope output characteristic or a negative slope output characteristic at the choice of the operator. Another object is to provide such a power supply which may also be operated with a zero slope output characteristic.

It is an object of the invention to provide a new and improved power supply with impedance control suitable for use with various loads such as arc lamps, welding, battery charging and the like.

It is an object of the invention to provide an impedance control for power supply including a power source having an output, control means for varying the power output of the power source, voltage detector means connected across the output of the power source and producing a control signal varying as a function of the output voltage of the power source, and circuit means for connecting the control signal to the control means in controlling relation for increasing the output of the power source as the output voltage increases for increasing the output current. A further object is to provide such apparatus including current detector means connected in series with the output of the power source and producing another control signal varying as a function of the output current of the power source, and circuit means for connecting the current control signal to the control means in controlling relation for reducing the output of the power source as the output current increases tending to maintain a constant output current. An additional object of the invention is to incorporate means for adjusting the magnitude of either or both of the control signals.

It is a particular object of the invention to provide such apparatus including selection means for selecting the polarity of the voltage control signal for selectively increasing or reducing the output of the power source as the output voltage increases for selectively increasing or decreasing the output current and thereby selecting positive or negative slope. A further object is to provide such apparatus wherein the selection means includes an open or neutral position eliminating the second control signal and providing the zero slope or constant current mode of operation.

It is a particular object of the invention to provide such apparatus in which the current detector means comprises a series resistor or other means in the output with means for varying the magnitude of the signal developed thereacross for the control means. A further object is to provide such apparatus wherein the voltage detector means comprises a resistor or other means connected across the output and including means for varying the signal developed thereacross.

It is an object of the invention to provide a new and improved impedance control which may be operated in conjunction with any conventional power source and which may utilize any conventional power source control means. The invention will be described herein in conjunction with a transformer, rectifier and filter as the power source and a saturable reactor as the control means, but it is understood that the invention is equally suitable with other conventional components.

Other objects, advantages, features and results of the invention will more fully appear in the course of the following description. The drawing merely shows and the description merely describes preferred embodiments of the present invention which are given by way of illustration or example.

Figure 1:
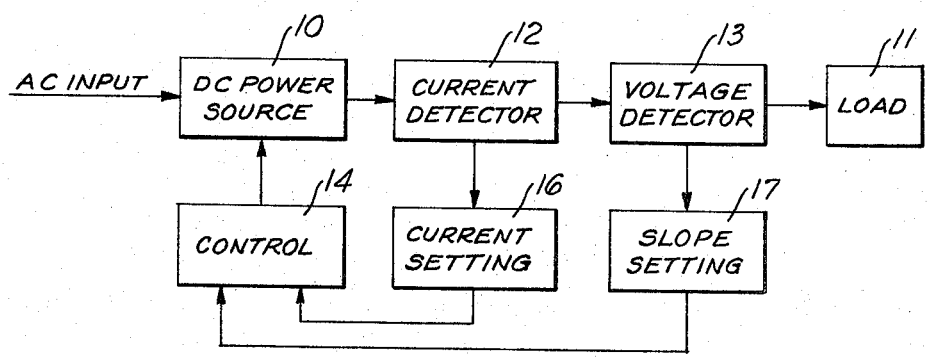
FIG. 1 is a block diagram of the preferred embodiment of the invention.

The apparatus of FIG. 1 includes a D.C. power source 10 having an A.C. input and a D.C. output, with the output connected to a load 11 through a current detector 12 and a voltage detector 13. The power source may be any conventional A.C. to D.C. power converting device and typically includes a transformer, a rectifier and a filter. A control 14 operates in response to one or more input signals to vary the output of the power source 10. The control may be any of the well-known power supply control devices and typically may be a saturable reactor connected in the primary or in the secondary side of the transformer.

The current detector provides an output signal which varies as a function of the output current of the power source. This signal is connected as one of the input signals to the control 14 through a current setting unit 16 which provides for manual adjustment of the current signal. The voltage detector 13 provides an output signal which varies as a function of the output voltage of the power source. This signal is also connected to the control 14 as an input signal through a slope setting unit 17 which permits adjustment of the magnitude of the voltage signal.

Figure 2:
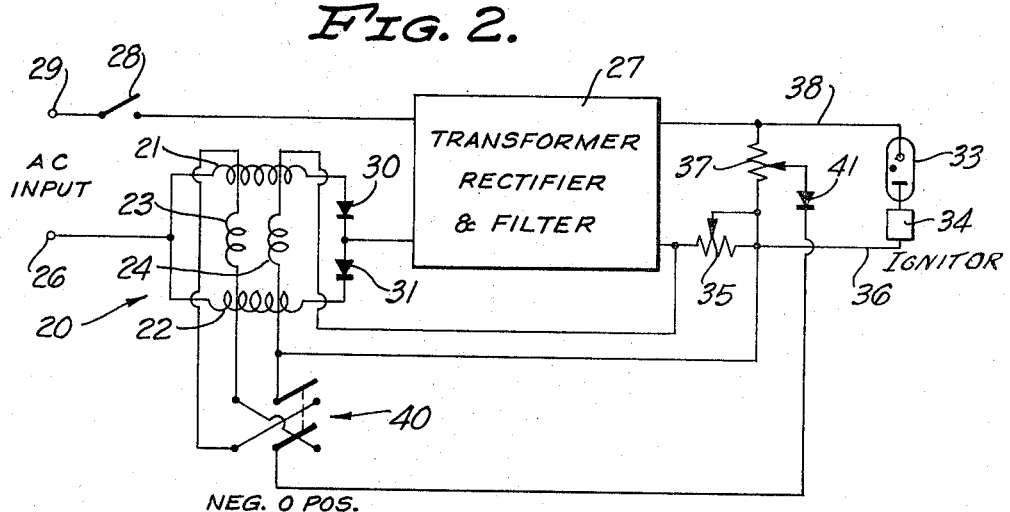
FIG. 2 is an electrical schematic of an impedance control incorporating the features of the invention.

A specific circuit incorporating the elements of the apparatus of FIG. 1 is shown in FIG. 2. A saturable reactor 20 with power windings 21, 22 and control windings 23, 24 functions as the control 14 and is connected between one terminal 26 of the A.C. input and the transformer of the D.C. power source 27. An on-off switch 28 is connected between the other input terminal 29 and the power source transformer. Rectifiers 30, 31 are connected in series with the power windings 21, 22, respectively, of the saturable reactor providing gain through conventional magnetic amplifier D.C. self-saturation.

A xenon arc lamp 33 with igniter 34 is connected as a load on the output of the power source 27. A potentiometer 35 is connected in series in the line 36 between the power source and the load. Another potentiometer 37 is connected across the lines 36, 38 which connect the power source to the load. The signal developed across the potentiometer 35 is connected to the control winding 24. A portion of the signal developed across the potentiometer 37 is connected to the moving arms of a double-pole double-throw switch 40 via the moving arm of the potentiometer 37. A blocking rectifier 41 may be utilized if desired.

The switch 40 has a negative position, an open position and a positive position. The control winding 23 is connected across the negative fixed contacts of the switch 40 and with reversed polarity across the positive fixed contacts of the switch 40.

In the operation of the power supply, a signal is developed across the potentiometer 35 which varies as the load current varies. The magnitude of the signal may be adjusted by moving the arm of the potentiometer 35 to change the resistance value of the potentiometer. This load current signal developed across the potentiometer 35 is connetced to the control winding 24 with a polarity to tend to reduce the output of the power source 27 when the load current increases and to tend to increase the output of the power source when the load current decreases. With the switch 40 in the open position, the current control functions to provide a constant current output which is the zero slope for the voltage-current characteristic of the supply.

The signal developed across the potentiometer 37 increases as the output voltage increases and decreases as the output voltage decreases. The magnitude of the signal coupled to the control winding 23 may be adjusted by means of the arm of the potentiometer 37. With the switch 40 in the positive position, the polarity of the circuitry is such that an increase in the output voltage and hence an increase in the signal on the winding 23 provides an increase in the output of the power source 27. Similarly, a decrease in the signal provides a decrease in the output of the power source. This is the positive slope operation of the device. If a negative slope operation is desired, the switch 40 is thrown to the reverse or negative position, providing a reversal in the polarity of the signal connected to the winding 23. This results in a decrease in output of the power source 27 when the output voltage increases and an increase in output from the power source when the output voltage decreases.

It has been found that arc lamps may be operated at constant light intensity over long periods of time by energizing the lamps from a power supply having a positive slope for the voltage-current characteristic. As the arc lamp ages, it requires an increasing magnitude of current to maintain the light intensity constant. Earlier systems have utilized some form of light intensity measurement and feedback to the power supply to vary the supply output as a function of light intensity for maintaining constant intensity. The present power supply utilizing positive slope control provides an increase in lamp current in conjunction with the increase in lamp voltage and therewith the desired increase in power required to maintain constant light over the long term. Normally the constant current or constant power feature of a supply would tend to maintain the same or virtually the same power output, which results in a decrease in light. However, in the apparatus of the invention, the voltage signal with positive slope characteristic overrides the current control and provides the desired current increase. It should be noted that in some applications, the current detector and current control portion of the apparatus may be omitted.

In some applications where short-term stability is the primary concern, lamps and other types of arcs may be operated at constant power or at some other negative slope condition. The constant power operation is often used for providing constant light intensity as in tests and laboratory calibrations which require only a few minutes or a few hours. The present apparatus may be operated in the negative slope condition by manipulation of the switch 40. Under this condition, the voltage control signal overrides a portion of the current control signal to decrease the power source current as the lamp voltage increases and to increase the power source current as the lamp voltage decreases. It should be noted that the apparatus may also be operated in the negative slope condition with the current control portion omitted.

The negative slope characteristic of the power supply is also suitable for use with arcs which have varying starting characteristics, being different when cold than when hot. The voltage detector circuitry senses the initial state as well as the change in arc voltage as the arc gets hotter and automatically varies the output current and power of the power source in any desired manner to otbain optimum starting characteristics and times.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an impedance control for a power supply for a xenon arc lamp, the combination of:
  a power source having an output;
  control means for varying the power output of said power source;
  current detector means connected in series in the output of said power source and producing a first control signal varying as a function of the output current of said power source;
  voltage detector means connected across the output of said power source and producing a second control signal varying as a function of the output voltage of said power source;
  means for adjusting the magnitude of said first control signal;
  means for adjusting the magnitude of said second control signal;
  first circuit means for connecting said first control signal to said control means in controlling relation for reducing the output of said power source as said output current increases tending to maintain a constant output current; and
  second circuit means for connecting said second control signal to said control means in controlling relation for varying the output of said power source and including selection means for selecting the polarity of said second control signal for increasing the output of said power source as said output voltage increases for increasing said output current and for reducing the output of said power source as said output voltage increases for decreasing said output current, as a function of the selected polarity.

2. In an impedance control for a power supply for a xenon arc lamp, the combination of:
  a power source having an output;
  control means for varying the power output of said power source;
  current detector means connected in series in the output of said power source and producing a first control signal varying as a function of the output current of said power source;
  voltage detector means connected across the output of said power source and producing a second control signal varying as a function of the output voltage of said power source;

first circuit means for connecting said first control signal to said control means in controlling relation for reducing the output of said power source as said output current increases tending to maintain a constant output current; and second circuit means for connecting said second control signal to said control means in controlling relation for varying the output of said power source and including selection means for selecting the polarity of said second control signal for increasing the output of said power source as said output voltage increases for increasing said output current and for reducing the output of said power source as said output voltage increases for decreasing said output current, as a function of the selected polarity.

3. In an impedance control for a power supply for a xenon arc lamp, the combination of:

a power source having an output;

control means for varying the power output of said power source;

voltage detector means connected across the output of said power source and producing a control signal varying as a function of the output voltage of said power source; and circuit means for connecting said control signal to said control means in controlling relation for varying the output of said power source and including selection means for selecting the polarity of said control signal for increasing the output of said power source as said output voltage increases for increasing the output current and for reducing the output of said power source as said output voltage increases for decreasing said output current, as a function of the selected polarity.

4. In an impedance control for a power supply for a xenon arc lamp, the combination of:

a power source having an output;

control means for varying the power output of said power source;

current detector means connected in series in the output of said power source and producing a first control signal varying as a function of the output current of said power source;

voltage detector means connected across the output of said power source and producing a second control signal varying as a function of the output voltage of said power source;

means for adjusting the magnitude of said first control signal;

means for adjusting the magnitude of said second control signal;

first circuit means for connecting said first control signal to said control means in controlling relation for reducing the output of said power source as said output current increases tending to maintain a constant output current; and second circuit means for connecting said second control signal to said control means in controlling relation for increasing the output of said power source as said output voltage increases for increasing said output current.

5. In an impedance control for a power supply for a xenon arc lamp, the combination of:

a power source having an output;

control means for varying the power output of said power source;

current detector means connected in series in the output of said power source and producing a first control signal varying as a function of the output current of said power source;

voltage detector means connected across the output of said power source and producing a second control signal varying as a function of the output voltage of said power source;

first circuit means for connecting said first control signal to said control means in controlling relation for reducing the output of said power source as said output current increases tending to maintain a constant output current; and second circuit means for connecting said second control signal to said control means in controlling relation for increasing the output of said power source as said output voltage increases for increasing said output current.

6. In an impedance control for a power supply for a xenon arc lamp, the combination of:

a power source having an output;

control means for varying the power output of said power source;

voltage detector means connected across the output of said power source and producing a control signal varying as a function of the output voltage of said power source; and circuit means for connecting said control signal to said control means in controlling relation for increasing the output of said power source as said output voltage increases for increasing the output current.

7. In an impedance control for a power supply for a xenon arc lamp, the combination of:

a power source having an output;

control means for varying the power output of said power source;

a first resistance connected in series in the output of said power source for developing thereacross a first control signal varying as a function of the output current of said power source;

a second resistance connected across the output of said power source for developing thereacross a second control signal varying as a function of the output voltage of said power source;

first circuit means for connecting at least a portion of said first control signal to said control means in controlling relation for reducing the output of said power source as said output current increases tending to maintain a constant output current; and second circuit means for connecting at least a portion of said second control signal to said control means in controlling relation for varying the output of said power source and including a selector switch for selecting the polarity of said second control signal for increasing the output of said power source as said output voltage increases for increasing said output current and for reducing the output of said power source as said output voltage increases for decreasing said output current, as a function of the selected polarity.

8. In an impedance control for a power supply for a xenon arc lamp, the combination of:

a power source having an output;

control means for varying the power output of said power source;

a first potentiometer connected in series in the output of said power source and producing between the moving arm and an end thereof a first control signal varying as a function of the output current of said power source;

a second potentiometer connected across the output of said power source and producing between the moving arm and an end thereof a second control signal varying as a function of the output voltage of said power source;

first circuit means for connecting said first control signal to said control means in controlling relation for reducing the output of said power source as said output current increases tending to maintain a constant output current; and second circuit means for conecting said second control signal to said control means in controlling relation for varying the output of said power source and including selection means for selecting the polarity of said second control signal for increasing the output of said power source as said output voltage increases for increasing said output current and for reducing the output of said power source as said output voltage increases for decreasing said output current, as a function of the selected polarity.

9. In an impedance control for a power supply for a xenon arc lamp, the combination of:
a power source having an output;
control means for varying the power output of said power source;
a resistance connected across the output of said power source for developing thereacross a control signal varying as a function of the output voltage of said power source; and
circuit means for connecting at least a portion of said control signal to said control means in controlling relation for varying the output of said power source and including a selector switch for selecting the polarity of said control signal for increasing the output of said power source as said output voltage increases for increasing said output current and for reducing the output of said power source as said output voltage increases for decreasing said output current, as a function of the selected polarity.

10. In an impedance control for a power supply for a xenon arc lamp, the combination of:
a power source having an output;
control means for varying the power output of said power source;
a first resistance connected in series in the output of said power source for developing thereacross a first control signal varying as a function of the output current of said power source;
a second resistance connected across the output of said power source for developing thereacross a second control signal varying as a function of the output voltage of said power source;
first circuit means for connecting at least a portion of said first control signal to said control means in controlling relation for reducing the output of said power source as said output current increases tending to maintain a constant output current; and
second circuit means for connecting at least a portion of said second control signal to said control means in controlling relation for increasing the output of said power source as said output voltage increases for increasing said output current.

11. In an impedance control for a power supply for a xenon arc lamp, the combination of:
a power source having an output;
control means for varying the power output of said power source;
a resistance connected across the output of said power source for developing thereacross a control signal varying as a function of the output voltage of said power source; and
circuit means for connecting at least a portion of said control signal to said control means in controlling relation for increasing the output of said power source as said output voltage increases for increasing the output current.

12. In an impedance control for a power supply for a xenon arc lamp, the combination of:
a power source having an output;
control means for varying the power output of said power source;
a first resistance connected in series in the output of said power source for developing thereacross a first control signal varying as a function of the output current of said power source;
a second resistance connected across the output of said power source for developing thereacross a second control signal varying as a function of the output voltage of said power source;
means for adjusting the magnitude of said first control signal;
means for adjusting the magnitude of said second control signal;
first circuit means for connecting said first control signal to said control means in controlling relation for reducing the output of said power source as said output current increases tending to maintain a constant output current; and
second circuit means for connecting said second control signal to said control means in controlling relation for increasing the output of said power source as said output voltage increases for increasing said output current.

13. In an impedance control for a power supply for a xenon arc lamp, the combination of:
a power source having an output;
control means for varying the power output of said power source;
a resistance connector across the output of said power source for developing thereacross a control signal varying as a function of the output voltage of said power source;
means for adjusting the magnitude of said control signal; and
circuit means for connecting said control signal to said control means in controlling relation for increasing the output of said power source as said output voltage increases for increasing the output current.

References Cited
UNITED STATES PATENTS

| | | | |
|---|---|---|---|
| 2,079,500 | 5/1937 | Foos. | |
| 2,714,188 | 7/1955 | Scherer | 323—45 X |
| 2,760,147 | 8/1956 | Couanault | 323—74 |
| 2,901,684 | 8/1959 | Bronikowski | 323—45 X |
| 3,005,145 | 10/1961 | McNamee | 323—89.12 |
| 3,042,848 | 7/1962 | Muchnick et al. | 323—66 X |
| 3,087,107 | 4/1963 | Hunter et al. | 323—66 X |
| 3,199,020 | 8/1965 | Hilker. | |
| 3,210,637 | 10/1965 | Gams | 323—89.12 |

JOHN F. COUCH, *Examiner.*

A. D. PELLINEN, *Assistant Examiner.*

UNITED STATES PATENT OFFICE
CERTIFICATE OF CORRECTION

Patent No. 3,354,384　　　　　　　　　　　November 21, 1967

Fred Benjamin

It is hereby certified that error appears in the above numbered patent requiring correction and that the said Letters Patent should read as corrected below.

In the heading to the printed specification, lines 4 and 5, for "Christie Electric Corporation" read -- Christie Electric Corp. --.

Signed and sealed this 25th day of February 1969.

(SEAL)
Attest:

Edward M. Fletcher, Jr.　　　　　　　　　　　EDWARD J. BRENNER
Attesting Officer　　　　　　　　　　　　　　Commissioner of Patents